March 31, 1931.  J. W. CARLSON  1,798,455
CHECK WRITING MACHINE
Filed Dec. 24, 1927   6 Sheets-Sheet 1

Inventor:
John W. Carlson

By: Williams, Bradbury
McCaleb & Hinkle
Attorneys.

Inventor:
John W. Carlson
By:
Williams Bradbury McCaleb & Hinkle
Attorneys.

Patented Mar. 31, 1931

1,798,455

UNITED STATES PATENT OFFICE

JOHN W. CARLSON, OF CHICAGO, ILLINOIS, ASSIGNOR TO HEDMAN MANUFACTURING COMPANY, OF CHICAGO, ILLINOIS, A CORPORATION OF ILLINOIS

CHECK-WRITING MACHINE

Application filed December 24, 1927. Serial No. 242,468.

My invention relates to check writing machines and more particularly to machines of this class in which the amount of the check is printed and scarified thereon by suitable printing and scarifying dies, the position of the dies being key set.

It is an object of my invention to provide a machine of the above-mentioned class which operates easily and quickly to imprint the desired amount upon a check or other negotiable instrument.

A further object is to provide a check writing machine in which the type carriers are set up in their natural order, that is, from left to right.

A further object is to provide improved differential mechanism for controlling the position of the type carriers.

A further object is to provide improved means for aligning the type carriers.

A further object is to provide improved selective means for releasing the type sectors and for controlling the set up mechanism.

A further object is to provide an improved resetting mechanism.

A further object is to provide means for indicating the amount set up prior to the printing operation.

Other objects will appear from the following description, reference being had to the accompanying drawings, in which.

The machine of my invention may be considered as comprising the following groups of mechanisms: (1) the key set differential mechanism; (2) the column selector mechanism; (3) the actuating mechanism for the type sectors; (4) the resetting mechanism; and (5) the main operating mechanism.

Referring to Figs. 1 to 5, the check writer comprises a base casting 16, in which is suitably mounted a serrated or otherwise irregularly surfaced platen 18, and which has a pair of upwardly and forwardly extending arms 20 secured to or formed integrally therewith. The major portion of the mechanism is enclosed within a casing 22, and is supported by a pair of side frames 24 and 26. These side frames are secured to a shaft 28 which is pivoted in the arms 20. The mechanism within the casing 22, which is supported by the side frames 24 and 26, is thus adapted to be moved toward and away from the base 16 during the operation of the machine. This pivotal movement is imparted to the side frames by the operation of a handle 30 which is fixed to the squared end of shaft 33, which extends transversely through the machine and has an arm 34 similarly secured at its opposite end. The handle 30 and arm 34 each have one of a pair of links 36, 38 pivotally secured thereto. The links 36 and 38 each have their opposite ends pivoted to slotted cam plates 40 which are pivotally mounted upon a shaft 42 and have suitable slots 46 fitting over rollers 48 which are rotatably mounted at the forward ends of the arms 20. It will thus be apparent that by swinging the handle 30 forward the cam plates 40 will be rotated counterclockwise through an angle of about 60° and due to the fact that the radii of the slots 46 in the plates 40 are not constant, the shaft 42, which is rotatably mounted in the side frames 24 and 26, will be forced downwardly, thus moving the entire mechanism within the casing downwardly to bring the type against the platen 18 as will hereinafter appear.

Figure 3:
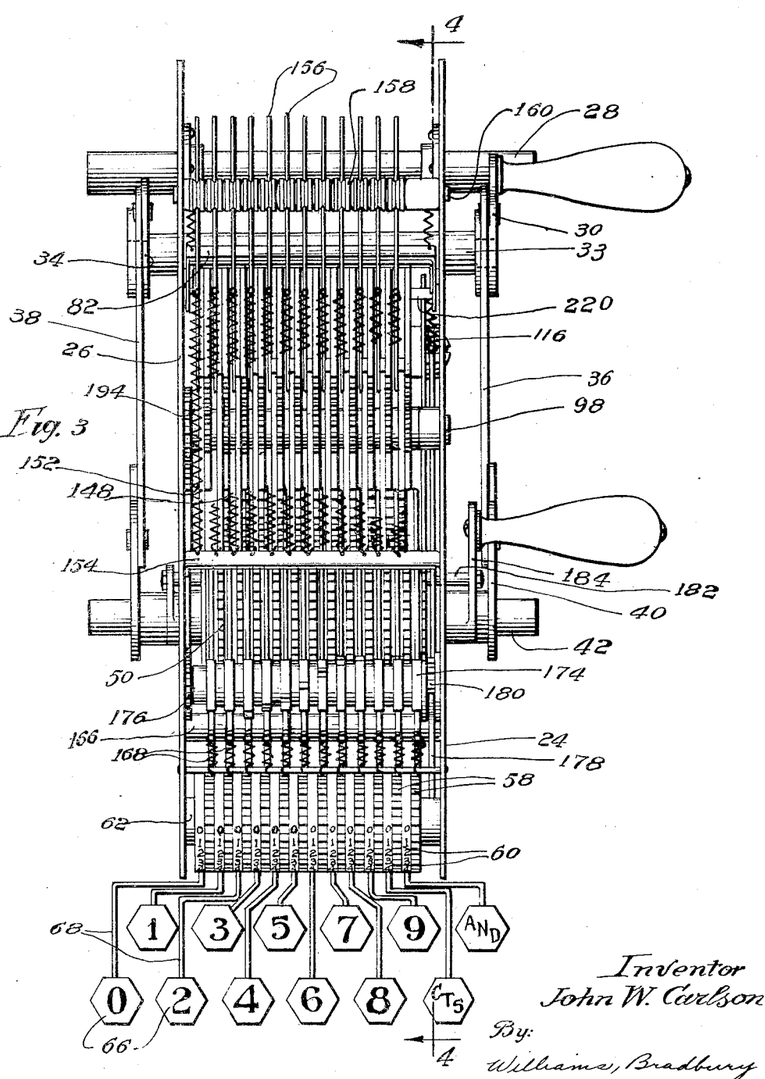
Fig. 3 is a plan view of the machine with the base and casing removed.
Figure 4:
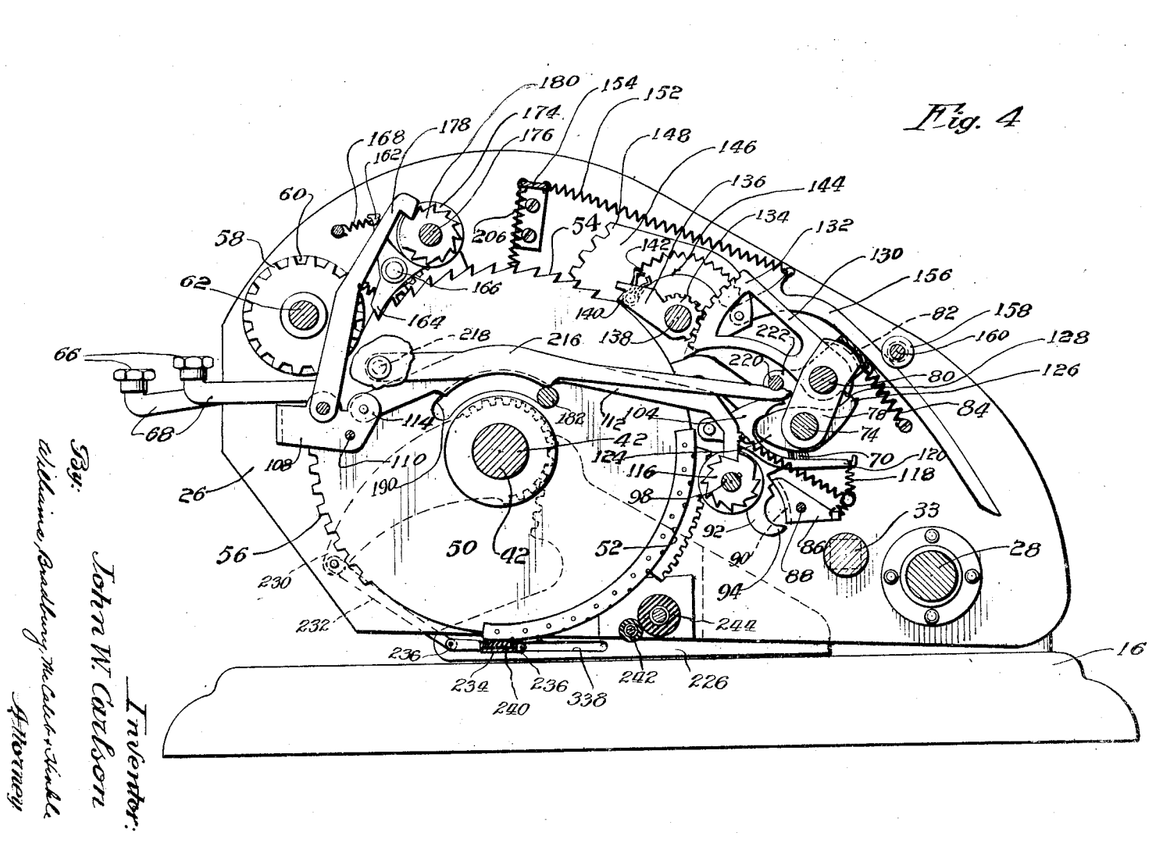
Fig. 4 is a vertical section taken on the line 4—4 of Fig. 3.

Referring to Figs. 3 and 4, a plurality of type carrying discs 50 are mounted side by side on the shaft 42 and have the type 52 welded, riveted or otherwise suitably secured thereto. Each of the type sectors has a ratchet toothed portion 54 formed throughout about 90 degrees of its circumference and a gear toothed portion 56 extending through an additional 90 degrees of the disc circumference. The gear tooth portion 56 of each of the type discs meshes with a pinion 58 which is secured to a register wheel 60, the gears and wheels being mounted for free rotation upon a shaft 62 which is carried in the side frames 24 and 26. These wheels will thus register the position of the type sectors by their indication which may be observed through a window 64 formed in the casing 22.

Figure 8:
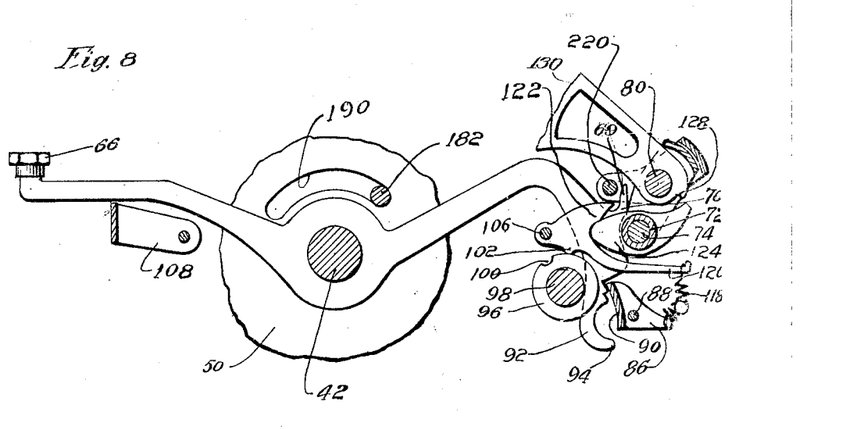
Figs. 8 and 9 are detail sectional views of the key controlled differential mechanism, the parts being shown in normal and operated positions, respectively.
Figures 9, 10:
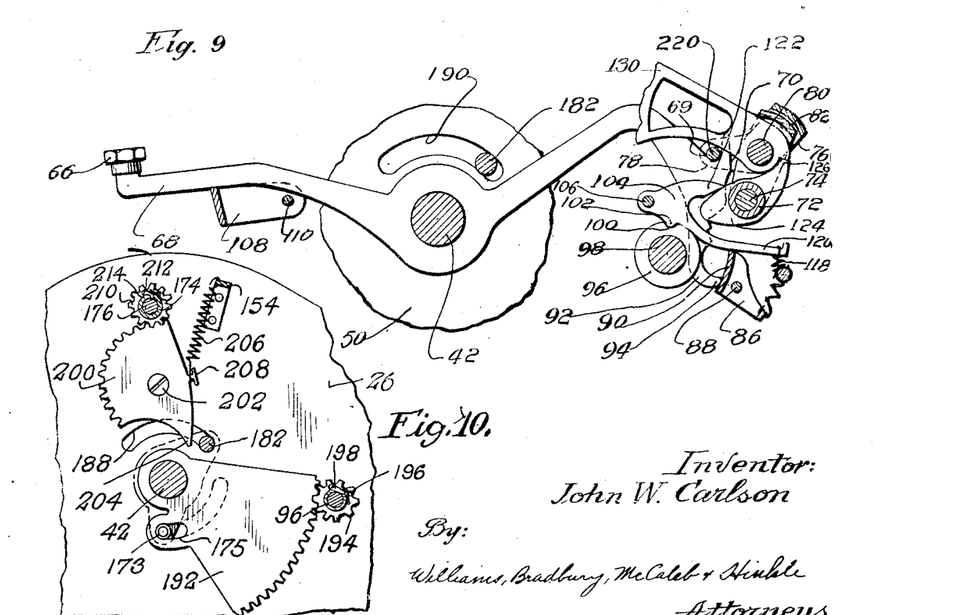
Fig. 10 is a detailed sectional view of the resetting mechanism.

As previously intimated, a key set differential mechanism is employed selectively to position the desired type for printing. This mechanism comprises a plurality of keys 66 carried by key bars 68 which are pivoted upon the shaft 42 and extend rearwardly therefrom, terminating in cam edges 70 of progressively increasing length, as best illustrated in Figs. 4, 8 and 9. These cam surfaces are adapted to cooperate with rollers 72 which are freely rotatable upon the shaft 74 carried by a bail 76 having a pair of arms 78 pivoted upon the shaft 80 adjacent the ends thereof, and connected by a cross-bar 82. The bail is normally resiliently held in the position shown in Fig. 4 by a spring 84 secured to the side frame of the machine. It will thus be seen that depression of any one of the keys 66 will cause the bail to rock counterclockwise against the tension of the spring 84, the degree of rocking being determined by the shape of the cam surface 70 adjacent the end of the key bar. Since these cam surfaces are of progressively increasing slope and the key bars each rock through the same angle whenever the keys are fully depressed, the bail 76 will be swung a distance corresponding to the numerical value of the key depressed.

A full stroke mechanism is provided to assure the complete depression of each of the keys. This mechanism includes a bail 86 pivoted between the side frames at 88 and having a cross piece 90 extending the full width of the machine and lying adjacent the lower ends 92 of the key bars. These end portions have suitable notches cut therein which are adapted to receive the upper edge of the cross piece 90 which normally rests in the upper notch. Upon partial depression of the key the cross piece 90 will engage the second notch and thus prevent the return of the key to normal position, thereby making it imperative for the operator to complete the key stroke. The cross piece 90 also serves as a means for preventing the depression of a second key before the key first pressed has returned to normal position, since the second notch is not as deep as the first notch, and when one of the keys is partially depressed the bail 86 will be swung clockwise a short distance, thus bringing the lower edge of the cross piece 90 above a toe 94 formed at the lower end of the portion 92 of the key bar.

When operated, the type discs 50 are set seriatim from the left to the right. The means for controlling this serial or progressive release of the type discs from left to right will now be described. A notched cylindrical selector 96 is mounted for free rotation upon a shaft 98 carried between the side frames 24 and 26 and has a plurality of shallow notches 100 spaced spirally about its cylindrical surface. These notches are so positioned as to be brought successively beneath the projections 102 formed on the selecting levers 104, the latter being suitably pivoted upon a shaft 106 carried by the side frames. Means are provided to rotate the selector 96. These means comprise a bail 108 pivoted upon a pair of studs 110, which are secured in the side frames, and having its cross piece lying beneath each of the key bars 68 so that upon depression of any one of these keys the bail will be moved counterclockwise. A pawl 112 is pivoted to an arm 114 formed at the rear end of the bail 108, the toe of the pawl engaging a ratchet wheel 116 which is rigidly secured to the cylindrical selector 96. Thus, upon depression of any one of the keys, the selector will be rotated through the angle represented by one of its teeth. Due to the arrangement of the notches in the selector, the lever 104, nearest the left-hand side of the machine, and associated with the first type sector 50 (from the left in Fig. 3), will be permitted to drop since its projection 102 will be in registry with a notch 100 in the selector, this action being assured by a spring 118 attached to a projecting arm 120 which is formed integral with the lever 104. The lever 104 has a contact arm 122 which is adapted to abut against the left-hand portion (Figs. 4, 8 and 9) of a lever 124 which is pivotally mounted upon the shaft 74. The right-hand end of the lever 124 has a tooth 126 which is adapted to be seated in a notch 128 formed in the hub portion of a gear segment 130. The teeth 132 of this segment are in mesh with a segmental gear 134 which is formed integrally with a stop arm 136, the arm being pivoted on a shaft 138 carried between the side frame members 24 and 26. The arm 136 has a tooth 140 which is adapted to engage with the teeth 54 formed in the type disc 50 and thus arrest movement thereof as will hereinafter appear.

The arm 136 carries a wire spring 142 which rides within a slot 144, formed in a plate 146 which is also freely pivoted on the shaft 138. The outer edge of the slot 144 is serrated, having a notch for each type on the type disc 50. The rear end of each of the key bars 68 has a hook portion 69 which, upon depression of the key, receives a rod 130

220 which is carried by a pair of arms 222 pivotally mounted on the shaft 80. The notches in the hook portions 69 of the various key bars are of different depths, and are complemental to the cam surfaces 70, that is, the greater the rise in the cam, the deeper will be the notch in the hook portion. Upon complete depression of any one key, the corresponding gear segment 130 will be rocked downwardly, carrying with it the rod 220 until the latter engages in the notch of the key bar which is actuated. The rod 220 thus serves as an overthrow preventer and makes positive the setting of the segment 130.

Figure 6:
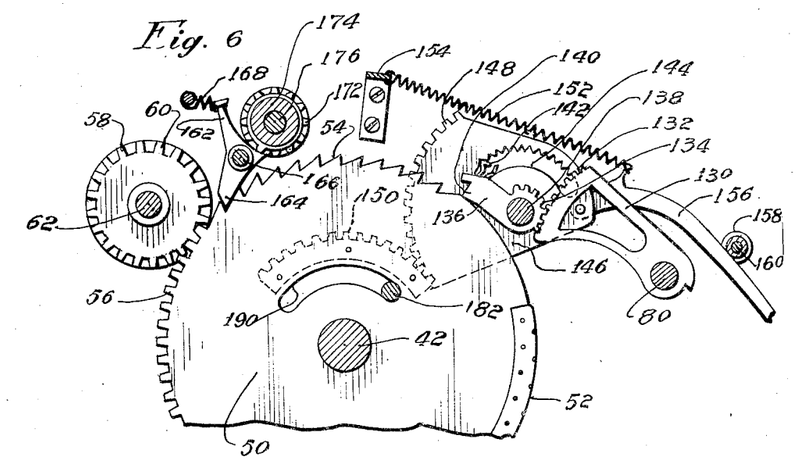
Figs. 6 and 7 are detail views of the type carrier setting mechanism showing the parts in normal and operated positions, respectively.
Figure 7:
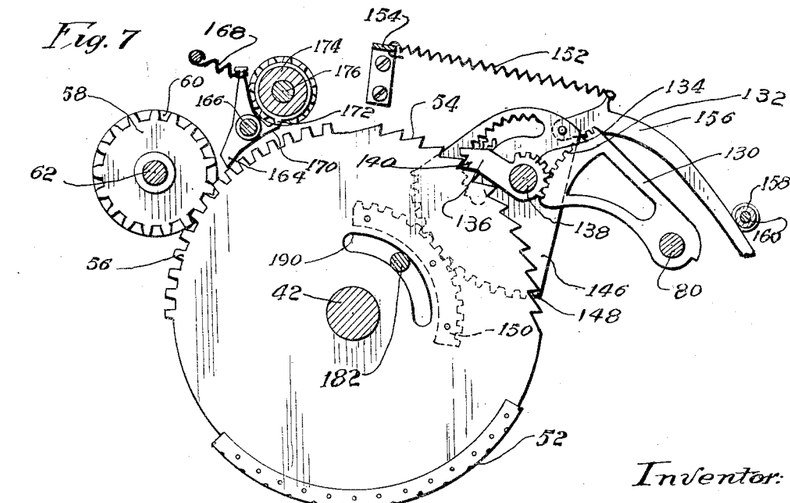

From the above, it will be seen that depression of a key will selectively and positively position the arm 136 with reference to the plate 146, the arm being retained in position by the engagement of the spring 142 in one of the notches formed in the serrated edge of the slot 144. The plate 146 has teeth 148 which are in mesh with a segmental gear plate 150 (Figs. 6 and 7) riveted to the type disc 50 and is normally urged to rotate counterclockwise by a spring 152, one end of which is attached to a bar 154 extending across the machine, and the other end of which is attached to a link 156 which is pivotally connected to the plate 146. The link 156 is guided by a grooved roller 158 which is freely rotatable upon a rod 160 carried in the side frames 24 and 26.

The type discs are thus normally urged to rotate clockwise (Fig. 6), their clockwise rotation being limited by the engagement of the tooth 140 on the arm 136 with one of the teeth 54 on the type disc.

The rotation of the type disc 50 under the influence of spring 152 is normally prevented by a three-armed latch 162 which has a tooth 164 engaging the first tooth 54 on the type disc and is normally biased to rotate counterclockwise about its pivot on the shaft 166 by a spring 168. The latch 162 has a projecting finger 170 which is adapted to be engaged by a tooth 172 formed upon a selector 174, the selector being rotatably mounted upon a shaft 176. The selector teeth 172, one for each type disc of the machine, are arranged spirally about the cylindrical surface of the selector. The selector is rotated counterclockwise (Fig. 6) through a small angle at each depression of a key by a pawl 178 which is pivoted to an arm of the bail 108 and the tooth of which engages the teeth of the ratchet wheel 180, which is secured to the cylindrical selector 174. It will thus be apparent that at each depression of a key one of the type discs 50 will be released, and its corresponding setting mechanism selectively positioned, the release of the sectors and the actuation of the setting mechanism taking place seriatim from left to right as the keys are successively depressed, the operation being controlled by the two selectors 174 and 96 which are operated in synchronism.

In Figs. 4 and 10 I have illustrated the resetting mechanism in detail. The machine is reset by counterclockwise rotation of its main shaft 42. A restoring rod 182 is carried by a pair of arms 184 and 186 and is oscillated whenever the shaft 42 is rocked. This restoring rod 182 extends the full width of the machine and through slots 188 formed in the side frames of the machine and extends through a slot 190 formed in each of the type discs 50. When the bar is thus oscillated counterclockwise, it returns the various type sectors which may have been selectively positioned to their normal positions where they are retained by their latches 164.

Means are also provided to reset the selectors 174 and 96. These means comprise a sector plate 192 which is connected by pin 173 and slot 175 to be oscillated by the shaft 42, and the teeth of which are in mesh with a pinion 194. The pinion 194 has a single notch 196 into which a dog 198 is adapted to be pressed by a suitable spring, the dog being pivoted to the selector 96. It will thus be seen that upon oscillation of the shaft 42 the pinion 194 will be rotated one complete revolution clockwise and then one complete revolution counterclockwise (Fig. 10), thus bringing its notch 196 into position to be engaged by the pawl 198 at some time during its rotative movement, irrespective of the position of the selector 96, and carry it the remaining portion of the rotative movement of the pinion 194, thereby to return the selector to normal position.

A similar mechanism is utilized to return the selector 174 to normal position. This means includes a sector plate 200 which is pivoted upon a stud 202, threaded in the side frame 24, and has a depending arm 204 which is adapted to be engaged by the restoring rod 182 as the latter is oscillated counterclockwise. The sector plate 200 is thus rotated clockwise against the tension of a spring 206, one end of which is secured to the plate at 208 and the other end of which is attached to the bar 154. The teeth of the sector plate 200 are in mesh with a pinion 210 which is freely rotatable upon the shaft 176 and carries a spring pressed dog 212 which is adapted to engage the selector cylinder 174 in a notch 214. Upon a complete oscillation of the plate 200 the pinion 210 will be rotated one complete revolution counterclockwise and then a complete revolution clockwise, thus permitting the dog 212 to engage in the notch 214, and upon its counterclockwise rotative movement to return the selector 174 to normal position.

A pair of arms 216 (Fig. 4) are pivoted to the side frames 24 and 26 at 218 and are adapted to be raised by the restoring rod 182 when the latter is oscillated. The rear ends of the arms 216 engage a rod 220 which is carried by a pair of arms 222 which are pivotally mounted upon the shaft 80. The rod 220 lies beneath all of the segments 130 and when raised is adapted to swing such of the segments 130 as have been operated and return them to normal position.

Figures 1, 5:
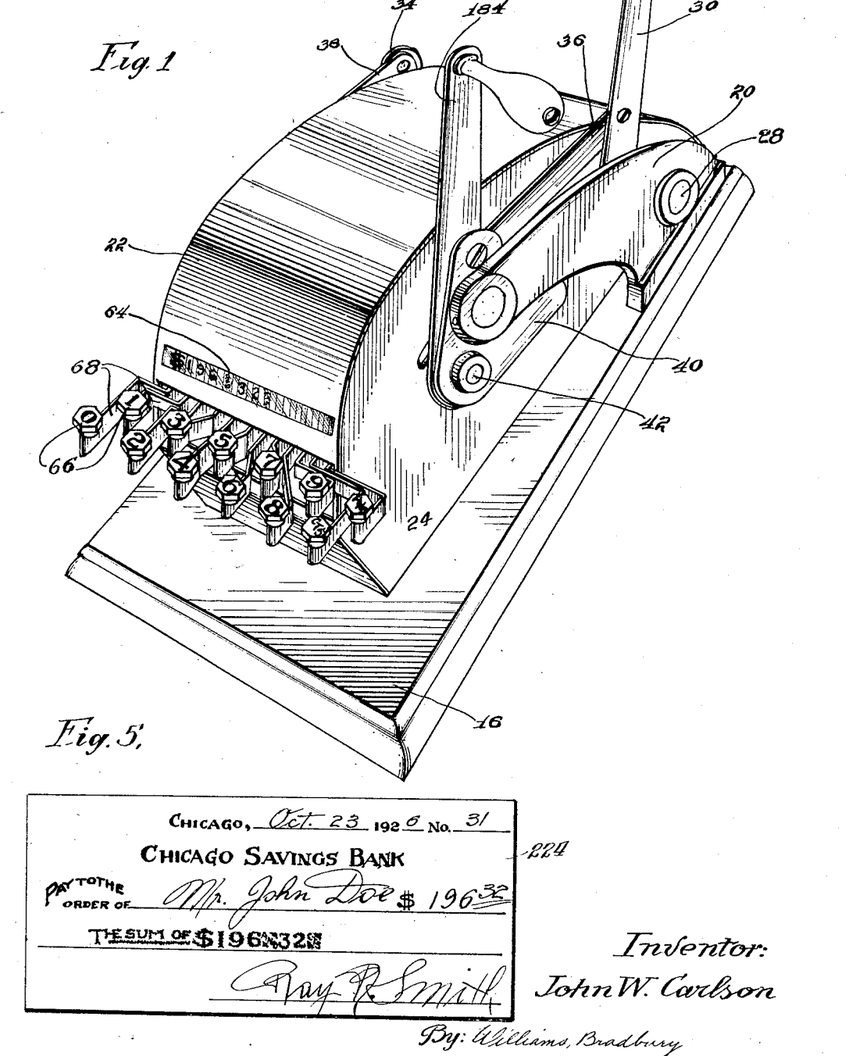
Fig. 1 is a perspective view of my improved machine.
Fig. 5 is a facsimile of a check upon which the amount has been printed and scarified by the machine of my invention.
Figure 2:
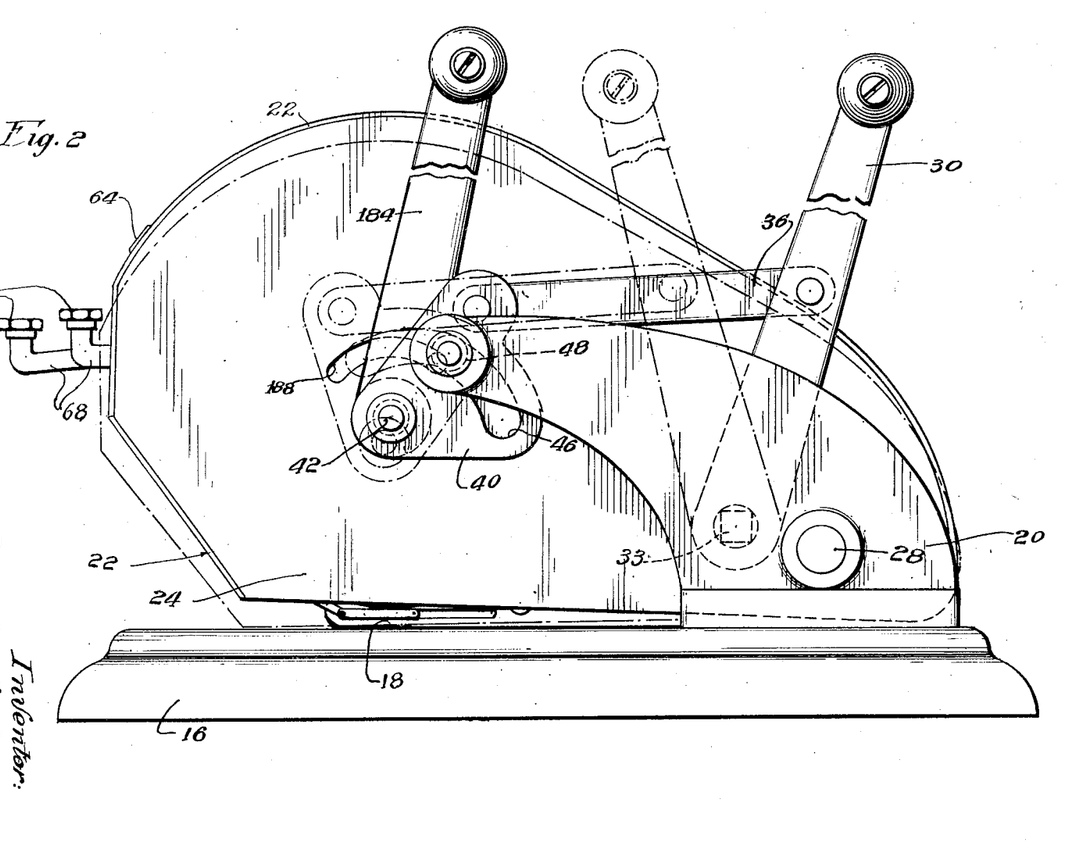
Fig. 2 is a right side elevation thereof.

In the use of the machine the check 224, such, for example, as illustrated in Fig. 5, is positioned in the machine so that the amount line lies above the platen 18. Suitable guides, such as are common in the art, may be employed to aid in thus positioning the check. A logotype bar is rigidly, but interchangeably, secured to the side frame 24 of the machine and adapted to print the words "The sum of $" or any other indicia as trademarks, etc., at the time that the amount is printed. The amount is entered into the machine by depression of the keys 66 in the usual order of writing, that is, in the check illustrated, the "1" key would be depressed first and the "9", "6", "and", "3", "2" and "cts" keys depressed seriatim. Upon depression of the keys the corresponding arms 136 will be selectively positioned, being retained in their positions by the springs 142. At the time of positioning of each of the arms 136, the associated latch 162 will release the type disc and the latter will be rotated clockwise under the tension of its spring 152, acting through the sector plate 146. It will continue thus to rotate until the tooth 140 contacts with one of the notches between the teeth 54 on the type disc, the time at which the tooth 140 will arrest rotative movement of the type disc being dependent upon the position to which the former has been selectively positioned with respect to the plate 146. Upon depression of each of the keys the selectors 96 and 174 will be advanced to release the latch 162 and condition the setting mechanism for operation. Upon completion of the setting up operation the handle 30 is pulled to swing the casing with all the mechanism contained therein downwardly, thereby bringing the set type against the platen 18 and making the impression upon the check. Any number of checks may thus be printed and scarified. When it is desired to change the set up of the machine, the resetting lever 184 is operated, which operation will restore the type discs 50 to normal position, reset the set up mechanism, the selector 96 and the selector 174 to normal position. If desired, a suitable releasable connection may be inserted between the link 36 and operating handle 184 so that the latter may be operated each time the printing operating handle 30 is actuated, such as would be the case were it desired to print a number of checks of different amounts. Such connection upon release would break the connection between the link 36 and handle 184 and make it possible to print a plurality of checks with the same amount, without making it necessary to set up the amount for each check.

A suitable means is provided for inking the type 52. Such means may consist of a sector plate 226 secured to the base 16 and having a gear segment 228 in mesh with the teeth formed upon an arm 230 which is pivotally mounted on the shaft 42. Each of the arms 230 is pivotally connected to one end of the link 232, the other end of which is pivotally joined to an ink pad carrier 234 which has two pairs of sidewardly projecting guiding lugs 236 which slide in slots 238 formed in the plates 226. Upon downward movement of the shaft 42 incident to the printing operation, the arms 230 will be oscillated first counterclockwise and then clockwise, first to move the pad carrier 234 (which has a suitable inking pad 240 secured thereto) rearwardly so as to cause the pad 240 to contact with the ink supply roll 242 which is thereby rotated and receives additional ink from the reserve ink supply roll 244, and then to return the latter to the position shown in Fig. 4, as more fully disclosed in the application of Carl M. Hedman, Serial No. 718,687, filed June 9, 1924.

While I have shown and described but a single embodiment of my invention, it will be apparent to those skilled in the art that numerous changes may be made in the mechanical details thereof without departing from the principle of my invention. I, therefore, desire the scope of my protection to be limited only by the claims which follow.

I claim:

1. In a check writing machine, the combination of a plurality of similar elements each carrying a plurality of type, resilient means tending to move said elements in one direction, latching means to prevent such movement, a plurality of type positioning keys, a sector geared to each of said elements, a differentially settable stop on each of said sectors, a selector for operatively connecting said keys with said stops in succession, and a second selector for releasing said latching means associated with the differentially set stop.

2. In a machine of the class described, the combination of a plurality of similar elements each carrying a plurality of type, resilient means tending to move said elements in one direction, latching means to prevent such movement, a plurality of type positioning keys, a member operatively connected to each of said elements, a differentially settable stop on each of said members, a selector for operatively connecting said keys with said stops seriatim, and a second selector for releasing said latching means associated with the actuated stop.

3. In a machine of the class described, the combination of a plurality of similar elements each carrying a plurality of type, resilient means tending to move said elements in one direction, latching means to prevent such movement, a plurality of type positioning keys, a sector geared to each of said elements, a settable stop on each of said sectors, a selector for operatively connecting said keys with said stops seriatim, a second selector for releasing said latching means associated with the actuated stop, a platen for said type, an operating mechanism for moving said type against said platen, and means actuated by said operating mechanism for returning said selectors to normal position.

4. In a check writer, the combination of a plurality of banks of type carrying elements, each bank comprising a rotatable disc carrying a plurality of type, a platen for said type, a spring tending to rotate said disc, a latch normally preventing such rotation, a member geared to said disc, a differentially settable stop on said member, and means to set said stop; a plurality of depressible keys, cam means on said keys adapted to set said stop, and means actuated upon the depression of said operating mechanism for returning said latches.

5. In a check writer, the combination of a plurality of banks of type carrying elements and differential stop mechanisms associated therewith, each bank comprising a rotatable disc carrying a plurality of type, a spring tending to rotate said disc, a latch normally preventing such rotation, a member geared to said disc, a settable stop on said member, and means to set said stop; a plurality of depressible keys, complemental cam means on said keys adapted to set said stop, and means actuated upon the depression of any one of said keys to release said latches in regular order.

6. In a check writer, the combination of a plurality of banks of type carrying elements and differential stop mechanisms, each bank comprising a rotatable disc carrying a plurality of type, a latch normally preventing such rotation, a member geared to said disc, a spring tending to rotate said member, a settable stop on said member, and means to set said stop; a plurality of depressible keys, cam means on said keys adapted to set any one of said stops, and means actuated upon the depression of any one of said keys to release said latches one after another.

7. In a check writing machine, the combination of a rotatable disc carrying a plurality of type, a sector geared to said disc so as to rotate in a direction opposite to the disc, a plurality of stops on said disc, and a differentially adjustable stop on said sector, said differentially adjustable stop being adapted to engage one of said stops on the type sector, thereby to limit rotative movement of the type disc.

8. In a machine of the class described, the combination of a rotatable disc carrying a plurality of type, a sector geared to said disc so as to rotate in a direction opposite to the disc, a plurality of stops on said disc, a differentially adjustable stop on said sector, the said differentially adjustable stop being adapted to engage one of said stops on the type sector, thereby to limit rotative movement of the type disc.

9. In a machine of the class described, the combination of a plurality of printing elements each having a plurality of type, differential stop mechanisms for positioning said element, a sector geared to said element and to control said stop mechanisms, automatic means for selecting the printing element to be actuated, a second automatic selecting means synchronized with the first automatic means and adapted to select the stop mechanism associated with the selected type carrying element, and means actuated upon the depression of any one of said keys to operate both of said automatic selecting means.

10. In a machine of the class described, the combination of a differentially settable type carrying element, a shaft adjacent said element, a sector geared to said element and rotatable upon said shaft, a stop arm freely mounted on said shaft, means for adjusting the position of said stop arm with respect to said sector, and detent means between said stop and said sector for holding said stop in adjusted position.

11. In a check writer, the combination of a plurality of elements each carrying a plurality of type, differential stop means for positioning said type, a plurality of depressible keys, and complemental cam means actuated by said keys positively to position said differential stop means.

12. In a machine of the class described, the combination of a differentially settable type carrying element having a plurality of stops, a shaft adjacent said element, a rotatable sector geared to said element and rotatable upon said shaft, a stop arm engageable with the stops on said element, means for adjusting the position of said stop arm with respect to said sector, and detent means between said stop and said sector for holding said stop in adjusted position.

13. In a machine of the class described, the combination of a plurality of elements each carrying a plurality of type, differential stop means for positioning said type, a plurality of depressible keys, complementally movable members actuated by said keys positively to position said differential stop means, and a movable rod engageable between said members to limit their movement.

14. In a machine of the class described, the combination of a rotatable disc carrying a plurality of type, a sector geared to said disc so as to rotate in a direction opposite to the disc, a plurality of stops on said disc, a differentially adjustable stop on said sector, the said differentially settable stop being adapted to engage one of said stops on the type sector, thereby to limit rotative movement of the type disc, and key means for adjustably positioning said stop.

15. In a machine of the class described, the combination of a plurality of printing elements each having a plurality of type, differential stop mechanisms for positioning said type, a set of keys adapted to control said stop mechanisms, automatic means for selecting the printing element to be actuated, a second automatic selecting means for selecting the stop mechanism associated with the selected type carrying element, and means operated upon the actuation of any one of said keys to operate both of said automatic selecting means.

16. In a machine of the class described, the combination of a plurality of type carrying elements, a plurality of keys for differentially positioning said elements, key bars rigidly connected to said keys, said key bars each having a plurality of normally aligned teeth and a projection, and a pivoted bail member normally having its cross bar resting in notches adjacent the teeth on said key bars, said bail being adapted to be pivoted upon depression of any one of said keys thereby to position its cross bar over the projections of the remaining key bars and prevent their depression.

17. In a check writer, the combination of a plurality of type carrying elements, a plurality of depressible keys for differentially positioning said elements, key bars rigidly connected to said keys, said key bars each having a plurality of teeth, resilient means to return said keys, and a pivoted bail member normally having its cross bar resting in aligned notches between the teeth on said key bars, said bail being adapted to engage beneath one of said teeth upon partial depression of one of said keys thereby to prevent the return thereof.

18. In a machine of the class described, the combination of a plurality of printing elements, a plurality of depressible keys, a selector mechanism for sequentially releasing said elements for operation, differentially movable stop means for limiting the movement of said elements, a second selector mechanism for sequentially conditioning said stop means for operation, and means actuated by said keys to operate both of said selector mechanisms and to differentially position a selected stop means.

19. In a machine of the class described, the combination of a differentially movable type carrying element, a plurality of stop projections thereon, a sector geared to said element, a stop pawl movable relative to said sector and adapted to engage said stop projections on said element thereby to limit the movement of said element, and manually operable means for differentially positioning said stop pawl on said sector.

20. In a machine of the class described, a type carrying element, differentially positionable stop means for selectively positioning said element, a manually operable key bar for differentially positioning said stop means, said key bar having a cam for actuating said stop means, and a member positioned between said key bar and said stop means and adapted positively to limit the movement of both.

21. In a machine of the class described, the combination of a plurality of type carrying elements, a plurality of key bars, a member adapted to be moved different distances by each of said key bars, a stop mechanism for each of said type carrying elements, a plurality of couplers for operatively connecting said member with one of said stop means, and a selector operable by said key bars successively to operatively connect said member with said stop means through said couplers.

22. In a check writing machine, the combination of a type carrying element, a member geared to said element so as to move therewith, an adjustable stop on said member adapted to engage said element to limit rotative movement thereof, and manually operable means to position said stop.

23. In a check writer, the combination of a plurality of type carrying elements having stops associated therewith, means for moving said elements, latches normally preventing such movement, members operatively connected to said elements so as to be movable therewith, differentially settable stop means on said members, a plurality of depressible keys, and means operable upon the depression of one of said keys to release one of said latches and differentially set one of said stop means.

In witness whereof, I hereunto subscribe my name this 22 day of Dec., 1927.

JOHN W. CARLSON.

CERTIFICATE OF CORRECTION.

Patent No. 1,798,455.  Granted March 31, 1931, to

JOHN W. CARLSON.

It is hereby certified that error appears in the printed specification of the above numbered patent requiring correction as follows: Page 5, lines 25 and 26, claim 4, strike out the words "said operating mechanism for returning said latches" and insert instead any one of said keys to release any one of said latches; same page, line 78, claim 9, strike out the words "a sector geared to said element and" and insert instead a set of depressible keys adapted; and that the said Letters Patent should be read with these corrections therein that the same may conform to the record of the case in the Patent Office.

Signed and sealed this 28th day of April, A. D. 1931.

(Seal)

M. J. Moore,
Acting Commissioner of Patents.